Aug. 7, 1928.
J. S. DAWLEY
DISPLAY DEVICE
Filed Nov. 5, 1925
1,680,016
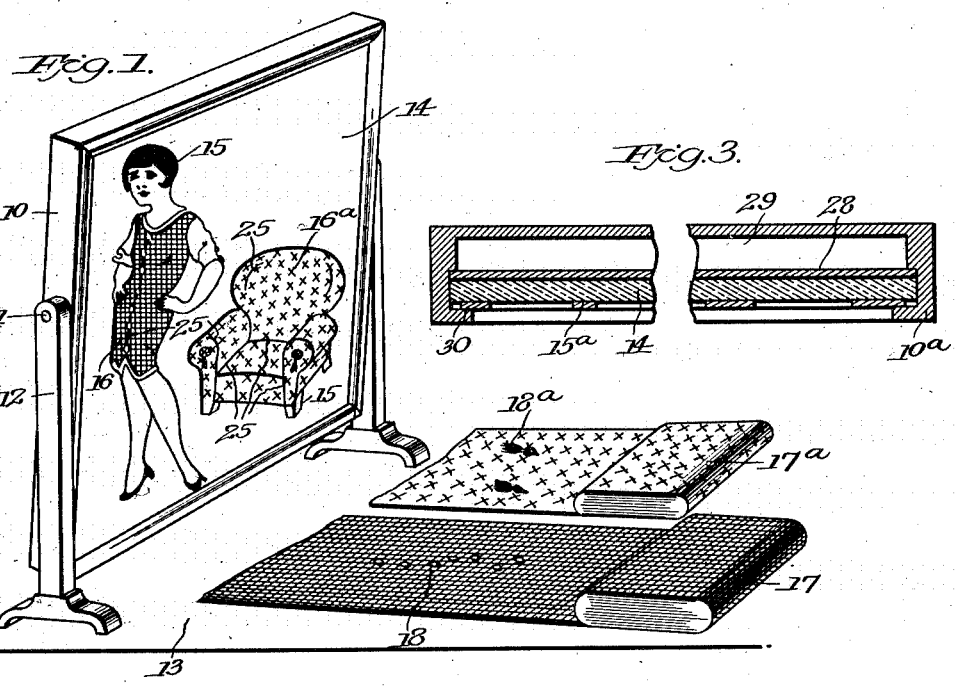
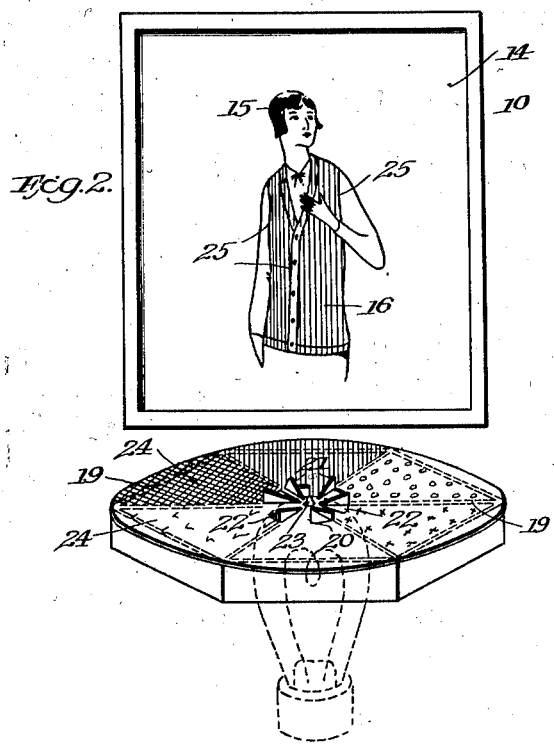
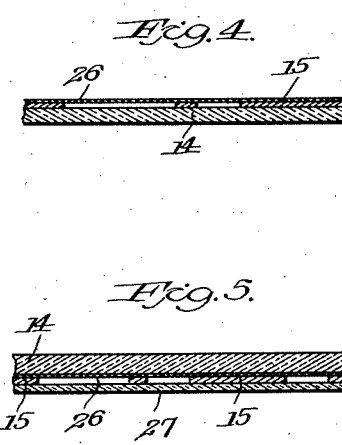
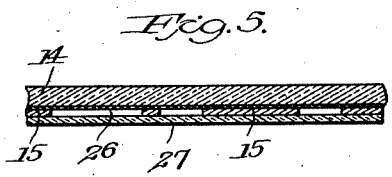
Inventor
James Searle Dawley
by Henry Orth Jr.
Attorney Patented Aug. 7, 1928.

1,680,016

UNITED STATES PATENT OFFICE.

JAMES SEARLE DAWLEY, OF NEW YORK, N. Y.

DISPLAY DEVICE.

Application filed November 5, 1925. Serial No. 67,088.

My invention relates to display devices for displaying by reflection the effect of materials on the outline of the figure or object to which the material is to be applied, without the necessity of draping or otherwise associating the material on the object, figure or the like.

My device consists primarily of a mirror, to which is applied, either directly or in association therewith the representation of the object or figure, leaving that portion of the representation to which the material is to be applied, a clear view portion through which the mirror reflects.

By placing the actual material at the front of my device the material is reflected on the mirror surface and completes the effect of an object as having the displayed material a part of it.

For example, a mirror has placed thereon a decalcomania, or has drawn or printed thereon a representation of a woman, the dress being a clear view portion only drawn in outline, while the head, hands, belt, or other decoration will be painted or drawn in full to cover that portion of the mirror to which it is applied. Dress goods placed in front of the device on a counter will be reflected in the clear view or dress portion as part of the picture, showing the effect of the texture, color &c. of the goods on the figure, as when made into a dress.

The display device may be made in various forms for displaying materials or goods of different character. For example, wall paper, where the trim of the room is painted or pasted on the mirror, the walls will reflect the sample of paper in front of them, and vice versa, the walls may be painted on the mirror and the trim portions left as clear view mirror surfaces that will reflect a panel of wood placed in front of the mirror.

Referring to the drawings, in which like parts are similarly designated—

Figure 1 is a perspective view illustrating my invention showing the reflection of goods laid on a store counter.

Fig. 2 is a modification, showing means for automatically changing the goods reflected, for window display.

Fig. 3 is a horizontal section of Fig. 2.

Fig. 4 illustrates one mode of making the mirror.

Fig. 5 shows a front face mirror similarly used.

The particular type of mirror and the specific correlation of mirror and design will depend upon the choice of the user.

Referring to Fig. 1, and considering Fig. 4 to be a section of mirror and picture.

I provide a suitable frame 10, mounted on pivots 11 so as to be capable of being tilted at the proper reflecting angle with regard to the position of a purchaser at a store counter 13.

In the frame is mounted a plate glass 14, on the back of which is painted or otherwise placed the design or designs 15, in this particular illustration a woman and a chair. The designs can be applied to the back of the glass conveniently by applying thereto a decalcomania, or printed on thin paper and stuck to the back of the glass. Those portions 16 of the figures that are to be represented by the material displayed are not represented in the figures, such as the dress of the woman and the covering of the chair, and the glass left to clear view at these portions 16, 16$^a$. The silvering 26 is then applied over the rear face, preferably only over the clear view portions 16 and varnished or otherwise protected on the back, as is customary with mirrors.

The store clerk then only has to lay a piece of goods, as 17, 17$^a$ on the counter 13, and it will be reflected only in the mirror portions of the figures.

Not only can the material be displayed and reflected, but also trimmings, for example buttons, as at 18, tassels, as at 18$^a$, may be laid flat upon the goods on the counter in proper position and their effect observed in the reflection in the display device.

In Fig. 2 I have illustrated a device for window display, and in front of the mirror picture have shown a suitable means for automatically changing the material.

This consists of a hot air motor comprising a frame 19 supported from a central portion 20 having a plurality of radial vanes 21 slightly inclined, arranged adjacent radial openings 22 in the central portion 20.

This central portion 20 can conveniently be of sheet metal, and the vanes 21 short sectors stamped from the metal and bent up along one edge.

The frame has at its centre a hole or a struck-up portion 23 that fits on the tip of an electric incandescent lamp and is supported thereby with but little friction.

Pieces of different fabrics are mounted on the frame by any suitable means, as by stitching, glue, or otherwise. The light from the lamp illumines the fabric, if sufficiently thin, from below, and at the same time a current of hot air is produced that passes through the frame openings 22 and acts on the vanes 21 to rotate the frame 19 and automatically bring the pieces of fabric mounted on the frame successively into reflecting position.

The clear view portions of the glass have, preferably painted or drawn thereon, certain lines, as 25, to properly define the figures, such as folds, seams, creases, overlaps and pockets. If these lines are placed on the front face of the glass they will be reflected in the silver surface on the back of the glass and appear as double lines whose distance apart will vary with the angle of view.

In order to avoid this, I use a front face mirror as indicated in Fig. 5, in which the silvered surface 26 is on the front face and the picture or figure 15 is applied directly to this silvered surface. The whole is then covered with a protecting glass 27.

The owner of a device such as above described cannot readily change his designs for different patterns of dresses or for different styles.

To overcome this defect I have constructed my display device as in Fig. 3, where 10$^a$ is the frame, holding the glass 14 carrying the mirror surface, in this case preferably, but not necessarily, on the back of the glass. The mirror or glass is protected at the back by a partition 28 of cardboard, wood or the like. This partition forms one side of a pocket or box 29 for the reception of spare designs 15 of cardboard, celluloid or other suitable material. These designs are on picture sheets 15$^a$ separate from the mirror, and are slipped in grooves 30 at the sides of the mirror at its front face.

These designs will have the lines forming part of the design over the desired reflecting surface, such as 25, as narrow strips of material, though in some instances it will be difficult to have these lines extend over to the side of the cut-out or clear view portion. To overcome this I use a continuous sheet of transparent celluloid on which the designs or figures are printed. The particular clear view portion through which the mirror is to be seen is free from printed design.

This has the advantage of avoiding any narrow strips of material extending into the mirrored field, avoids liability to breaking or tearing them off the picture sheet when changing the design sheet, simplifies manufacture, as no cut-outs have to be made in the sheet, and enables a much more rapid change of figures, as they do not have to be so carefully handled. Moreover, these sheets lie flatter and are less liable to buckle and bend.

My invention is not limited to any particular design or combination of designs or figures, and primarily consists of a figure in which that portion to be used for display purposes is a reflecting surface into which is reflected the goods or material to be displayed, said goods or material being suitably supported in reflecting position, most generally on a store counter.

I claim—

1. A demonstrating device comprising a mirror having picture portions partially covering the same, the uncovered portions of the mirror being associated with the picture portions, whereby when material is placed in reflecting relation to said uncovered portions the figure becomes completed by the reflection of material.

2. A demonstrating device comprising a mirror, and a mounting therefor to permit the mirror to be inclined, in combination with a design having picture portions associated with clear view portions, said mirror being arranged for reflection of a suitable material separate from said design and mirror when the material is placed in reflecting relation to the mirror through said clear view portions.

3. A demonstrating device comprising a front face mirror, a mounting therefor, a design associated with said mirror having clear view portions through which the mirror is exposed for reflection, whereby when material is placed in front of said mirror in reflecting relation the design will be completed by the reflection of the material through said clear view portions in the mirror.

4. A demonstrating device comprising a mirror and a mounting therefor, in combination with a picture sheet, means to support the sheet in proximity to the face of the mirror, said picture sheet having picture portions covering those portions of the mirror behind them, and clear view portions through which the mirror may be seen, whereby when material is placed in front of the device it will be reflected in the mirror through said clear view portions to complete the picture.

5. A demonstrating device comprising a frame, a mirror mounted therein having grooves to the front of the mirror, a removable picture sheet mounted in said grooves, said picture sheet having picture portions and associated clear view portions, whereby when material is placed in reflecting relation to said mirror the picture will be completed by the reflection of the material in the mirror through said clear view portions.

6. A demonstrating device, comprising a mirror having picture portions partly covering the same, and uncovered clear view portions associated with the picture portions, in combination with means to successively bring pieces of material into reflecting position in the mirror through said clear view portions to complete the picture.

7. A demonstrating device, comprising a mirror having picture portions partly covering the same, and uncovered clear view portions associated with the picture portions, in combination with means to automatically and successively bring pieces of material into reflecting position in the mirror through said clear view portions to complete the picture.

8. A demonstration device, comprising a mirror, a mounting therefor, a design associated with the mirror having picture portions and related clear view portions, means to support several pieces of material and means to move the support into reflecting position by the mirror through said clear view portions.

9. A demonstration device, comprising a mirror, a picture sheet in front thereof having picture portions and clear view portions, a hot air motor at the front of the mirror, said motor comprising an electric incandescent lamp, a frame pivoted on the tip of said lamp and having openings near its centre and vanes adjacent said openings, whereby pieces of fabric supported on said frame will be successively rotated into reflecting position in the mirror to complete the picture through said clear view portions by the current of hot air from said lamp against the vanes.

In testimony that I claim the foregoing as my invention, I have signed my name hereto.

JAMES SEARLE DAWLEY.